United States Patent
Yu et al.

(10) Patent No.: US 11,949,245 B2
(45) Date of Patent: Apr. 2, 2024

(54) WIRELESS POWER SUPPLY DEVICE, WIRELESS POWERED DEVICE, WIRELESS POWER TRANSMISSION SYSTEM AND MANUFACTURING METHOD THEREOF

(71) Applicant: ABB POWER ELECTRONICS INC., Plano, TX (US)

(72) Inventors: Qixue Yu, Shanghai (CN); Junfeng Guan, Shanghai (CN); Ming Fu, Shanghai (CN)

(73) Assignee: ABB Power Electronics Inc., Plano, TX (US)

( * ) Notice: Subject to any disclaimer, the term of this patent is extended or adjusted under 35 U.S.C. 154(b) by 0 days.

(21) Appl. No.: 17/905,003

(22) PCT Filed: Mar. 13, 2020

(86) PCT No.: PCT/CN2020/079273
§ 371 (c)(1),
(2) Date: Aug. 25, 2022

(87) PCT Pub. No.: WO2021/179302
PCT Pub. Date: Sep. 16, 2021

(65) Prior Publication Data
US 2023/0109007 A1 Apr. 6, 2023

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
See application file for complete search history.

(56) References Cited

U.S. PATENT DOCUMENTS

2008/0211455 A1 9/2008 Park et al.

FOREIGN PATENT DOCUMENTS

| CN | 202094712 U | 12/2011 |
|----|-------------|---------|
| CN | 104158269 A | 11/2014 |
| CN | 204190475 U | 3/2015 |
| CN | 106130083 A | 11/2016 |
| CN | 108075578 A | 5/2018 |

OTHER PUBLICATIONS

International Search Report and Written Opinion, issued by the ISA/CN National Intellectual Property Administration; regarding corresponding patent application Serial No. PCT/CN2020/079273; dated Dec. 10, 2020; 8 pages.

*Primary Examiner* — Robert L Deberadinis
(74) *Attorney, Agent, or Firm* — Armstrong Teasdale LLP

(57) ABSTRACT

Wireless power supply devices, wireless powered devices, wireless power transmission systems, and manufacturing methods thereof. The wireless power supply device can include a first circuit configured to convert a DC voltage to an AC voltage for wireless power transmission between the wireless power supply device and a powered device. The system can also include a pulse signal receiver configured to receive a first pulse signal from the powered device and to generate a second pulse signal based on the first pulse signal, the first pulse signal being generated based on a feedback signal of the powered device indicating information associated with received power of the powered device. The system can also include a first control unit coupled to the first circuit and the pulse signal receiver, and configured to control conversion of the first circuit based on the second pulse signal.

18 Claims, 3 Drawing Sheets

WIRELESS POWER SUPPLY DEVICE, WIRELESS POWERED DEVICE, WIRELESS POWER TRANSMISSION SYSTEM AND MANUFACTURING METHOD THEREOF

CROSS-REFERENCE TO RELATED APPLICATIONS

This is a national stage application which claims priority to International patent application Serial No.: PCT/CN2020/079273, filed on Mar. 13, 2020; and which is herein incorporated by reference in its entirety.

FIELD

Embodiments of the present disclosure generally relate to a wireless power supply device, a wireless powered device, a wireless power transmission system and a manufacturing method thereof.

BACKGROUND

In general, a wireless power supply device, such as a wireless power converter or a wireless power charger, requires a high-quality output regulation and therefore requires a good dynamic response. Due to the wireless structure, the process of achieving the above performance becomes complicated.

Conventionally, in a primary side of a wireless power charger, an inverter converts a DC voltage to a high frequency AC voltage, and then a separable high frequency transformer with compensation network to transfer the high frequency AC voltage to the secondary side. After a rectifier circuit, the high frequency AC voltage is converted to a DC output voltage or a DC output current. The signal data associated with the DC output voltage or the DC output current are transferred from the secondary side to the primary side through wireless communication modules.

The wireless communication modules typically use the communication technologies such as RFID, Bluetooth, Zigbee, etc. The advantage of these communication methods is that they are not sensitive to the relative positions of the transmitters and receivers.

SUMMARY

Embodiments of the present disclosure provide a wireless power supply device, a wireless powered device, a wireless power transmission system and a manufacturing method thereof.

In a first aspect, a wireless power supply device is provided. The wireless power supply device comprises a first circuit coupled to a DC supply and configured to convert a DC voltage of the DC supply into an AC voltage to enable wireless power transmission between the wireless power supply device and a powered device; a pulse signal receiver configured to receive a first pulse signal from the powered device and to generate a second pulse signal based on the first pulse signal, the first pulse signal being generated based on a feedback signal of the powered device indicating information associated with received power of the powered device; and a first control unit coupled to the first circuit and the pulse signal receiver, and configured to control conversion of the first circuit based on the second pulse signal.

In the scheme for the wireless power supply proposed in the present disclosure, a pulse signal is transferred from the powered device to the wireless power supply device for providing the information associated with the received power at the powered device, to adjust the wireless power supply. In this way, the speed of the feedback response in the system will be increased and therefore the performance of the system can be improved.

In some embodiments, the first pulse signal is an optical pulse signal, and wherein the pulse signal receiver comprises a photo diode configured to receive the optical pulse signal and convert the optical pulse signal to an electrical pulse signal as the second pulse signal.

For the transmission of the pulse signal, a photo diode at the wireless power supply device is provided for achieving an optical communication between the pulse signal receiver of the wireless power supply device and the pulse signal transmitter of the powered device. Since the cost of the optical element is much lower than that of chips in a conventionally used communication module, the cost can be reduced. At the same time, since the fast transmission of the high frequency pulse signal does not depend on specific communication protocols, the speed of dynamic response can be accelerated.

In some embodiments, the first circuit comprises an inverter comprising a plurality of switching elements to invert the DC voltage into the AC voltage.

In some embodiments, the first control unit configured to recover the feedback signal from the second pulse signal; determine the information associated with received power of the powered device based on the feedback signal; and generate a drive signal based on the information, to control an operation of the plurality of switching elements.

In some embodiments, the wireless power supply device further comprises a signal amplifier coupled between the first control unit and the pulse signal receiver and configured to amplify the first electrical signal.

The first control unit of the wireless power supply device in the present disclosure may recover the feedback signal intended to be transferred from the powered device based on the received pulse signal and determine the operation of the inverter based on the information indicated in the feedback signal, to achieve a high-quality output regulation.

In a second aspect, a wireless powered device is provided. The wireless powered device comprises a second circuit configured to receive, in a wireless manner, power from a wireless power supply device; a second control unit coupled to the second circuit and configured to generate, based on an output signal from the second circuit, a feedback signal indicating information associated with the received power of the powered device; and a pulse signal transmitter coupled to the second control unit and configured to generate a first pulse signal from a third pulse signal generated based on the feedback signal and to transmit the first pulse signal to a pulse signal receiver of the wireless power supply device.

At the powered device side, an output signal of the circuit of the powered device may contribute to generating a feedback signal for the dynamic response. To transmit the feedback signal reliably, the feedback signal may be converted to be a pulse signal, so that the performance of the system can be improved.

In some embodiments, the third pulse signal is an electrical pulse signal, wherein pulse signal transmitter comprises an infrared emitting diode configured to convert the electrical pulse signal to an optical pulse signal as the first pulse signal and to transmit the optical pulse signal to the pulse signal receiver.

In some embodiments, the third pulse signal is an electrical pulse signal, and wherein pulse signal transmitter comprises a light emitting diode configured to convert the electrical pulse signal to an optical pulse signal as the first pulse signal and to transmit the optical pulse signal to the pulse signal receiver.

For the transmission of the pulse signal, optical elements at the wireless powered supply device is provided for achieving an optical communication between the pulse signal receiver of the wireless power supply device and the pulse signal transmitter of the powered device. Since the cost of the optical element is much lower than that of chips in a conventionally used communication module, the cost can be reduced. At the same time, since the fast transmission of the high frequency pulse signal does not depend on specific communication protocols, the speed of dynamic response can be accelerated.

In some embodiments, the second control unit further comprises a Pulse Width Modulation (PWM) signal generation circuit configured to generate the third pulse signal based on the feedback signal, a pulse width of the third electrical signal being modulated related to the received power.

In some embodiments, the second control unit further comprises a voltage-to-frequency conversion circuit configured to generate the third pulse signal based on the feedback signal, a frequency of the third electrical signal being converted related to the received power.

In some embodiments, the second control unit further comprises a drive signal generation unit configured to generate a third pulse signal based on the feedback signal, the third pulse signal being indicating a regulation pattern for the wireless power supply device related to the received power.

There are different ways to convert the feedback signal to a pulse signal, which may depend on the type of the feedback signal. In this way, multiple types of the feedback signal can be a signal for indicating information associated with the received power at the powered device, to provide a dynamic response to the power supply device, which may increase the flexibility of the system.

In a third aspect, a wireless power transmission system is provided. The wireless power transmission system comprises a wireless power supply device of the first aspect and a wireless powered device of the second aspect.

In a fourth aspect, a manufacturing method of wireless power transmission system is provided. The method comprises providing a wireless power supply device of the first aspect; and providing a wireless powered device of the second aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
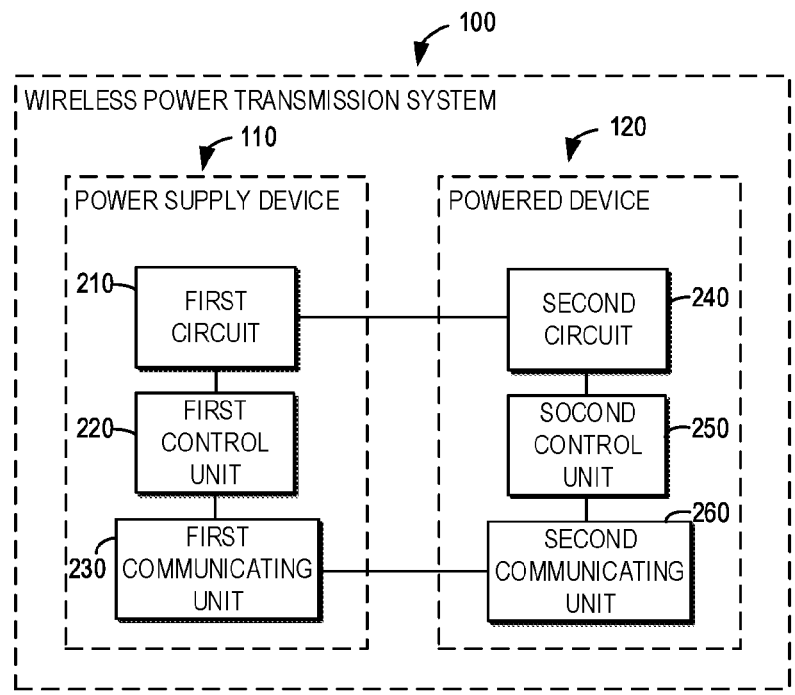
FIG. 1 illustrates a simplified block diagram of a wireless power transmission system having a wireless power supply device and a wireless powered device in accordance with embodiments of the present disclosure.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As mentioned above, in general, a wireless power supply device, such as a wireless power converter or a wireless power charger, requires a high-quality output regulation and therefore requires a good dynamic response. Due to the wireless structure, the process of achieving the above performance becomes complicated.

Conventionally, in a primary side of a wireless power charger, an inverter converts a DC voltage to a high frequency AC voltage, and then a separable high frequency transformer with compensation network to transfer the high frequency AC voltage to the secondary side. After a rectifier circuit, the high frequency AC voltage is converted to a DC output voltage or a DC output current. The signal data associated with the DC output voltage or the DC output current are transferred from the secondary side to the primary side through wireless communication modules.

The wireless communication modules typically use the communication technologies such as RFID, Bluetooth, Zigbee, etc. The advantage of these communication methods is that they are not sensitive to the relative positions of the transmitters and receivers.

However, there are still some problems in the conventional system, for example, the cost of the chips typically used in the communication module are expensive and requires complicated program coding with more development effort. In order to keep robust at some electromagnetic interference environment, the communication is not allowed to be proceed with a high speed, so the bandwidth of the converter is very narrow.

Moreover, only limit communication channels can be used at the same place, which means that a limit number of wireless power supply devices can be allowed to work at the same time in a same place.

Therefore, the present disclosure proposes a wireless power supply device and a wireless powered device, which may transfer the feedback signal therebetween with a high speed and therefore achieve a low cost and high quality dynamic response and output regulation.

Principle and implementations of the present disclosure will be described in detail below with reference to FIGS. 1 to 3B. FIG. 1 illustrates a simplified block diagram of a wireless power transmission system having a wireless power supply device and a wireless powered device in accordance with embodiments of the present disclosure.

As shown in FIG. 1, the wireless power transmission system 100 may comprise a wireless power supply device 110, which may also be referred to a primary side of the wireless power transmission system 100, and a wireless powered device 120, which may also be referred to as a secondary side of the wireless power transmission system 100. The wireless power supply device 110 may comprise a first circuit 210. The first circuit 210 may be configured to convert the DC voltage from the DC supply to an AC voltage. The wireless powered device 120 may comprise a second circuit 240, which may be coupled to the first circuit 210 and receive the AC voltage from the first circuit 210.

Based on the received power from the wireless power supply device 110, the second circuit 240 may generate an output signal. The wireless powered device 120 further comprises a second control unit 250 coupled to the second circuit 240. The second unit 250 may generate, based on the output signal, a feedback signal indicating information associated with the received power at the wireless powered device 120.

For the further transmission of the feedback signal, the second control unit 250 may convert the feedback signal to a pulse signal. The wireless powered device 120 further comprises a pulse signal transmitter 260 coupled to the second control unit 250. The wireless power supply device 110 may also comprise a pulse signal receiver 230. The pulse signal transmitter 260 may transmit the pulse signal, generated at the second control unit 250, to the pulse signal receiver 230 of the wireless power supply device 110.

The wireless power supply device 110 may further comprise a first control unit 220. The first control unit 220 may be coupled to the pulse signal receiver 230 and configured to process the received pulse signal. The first control unit 220 may recover the feedback signal, which is intended to be transmitted from the wireless powered device 120, and control the power supply of the first circuit 210 based on the information associated with received power at the wireless powered device 120, indicated in the feedback signal.

Figure 2:
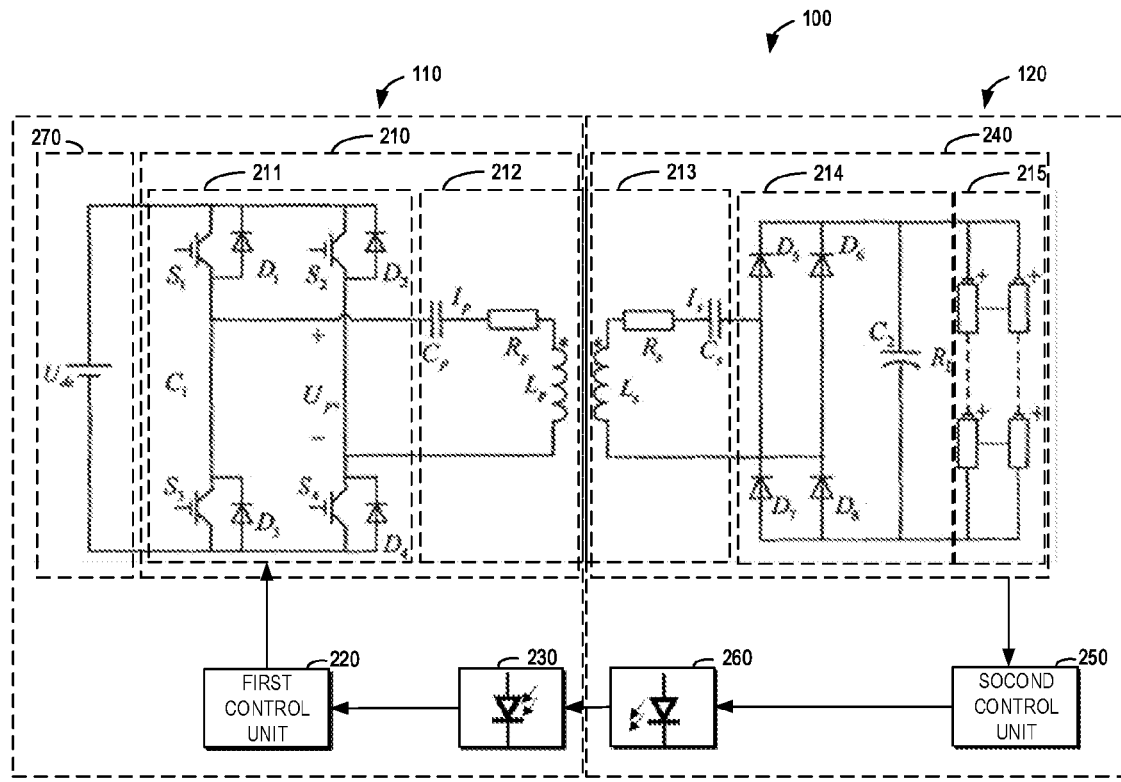
FIG. 2 illustrates an example of the wireless power transmission system according to embodiments of the present disclosure.

FIG. 2 illustrates an example of the wireless power transmission system according to embodiments of the present disclosure. With reference to FIG. 2, the feedback procedure of the wireless power transmission system will be further described in detail.

As shown in FIG. 2, the first circuit 210 of the wireless power supply device 110 is coupled to the DC source 270. The first circuit 210 may comprise an inverter 211. The inverter 211 may consist of a plurality of switching elements, such as Metal Oxide Semiconductor Field Effect Transistors (MOSFETs) shown in FIG. 2. It is to be understood that the inverter 211 may also comprise other type of switching elements. The inverter 211 may invert the DC voltage from the DC source 270 into the AC voltage.

The first circuit 210 may also comprise a primary side transformer 212. The second circuit 240 of the wireless powered device 120 may comprise a secondary side transformer 213. The primary side transformer 212 and the secondary side transformer 213 may interact with each other to transfer the high frequency AC voltage to the rectifier circuit 214 of the second circuit 240. Then the rectifier circuit 214 may convert the high frequency AC voltage to the DC output voltage or the DC output current, which may be provided to a load 215.

As mentioned above, the second circuit 240 may generate an output signal based on the received power from the first circuit 210. It is to be understood that the output signal may be generated based on a current or a voltage of the second circuit 240. That is, the output signal may be a DC signal or a low frequency signal. For example, the output signal may be a sample signal of the output voltage or the output current.

Then the second circuit 250 may generate a feedback signal indicating information associated with received power based on the output signal. Depending on the different output signals, the feedback signal may be a DC signal or low frequency signal or a high frequency signal. For example, the feedback signal may be a sample signal of the output voltage or output current, a loop compensation network output signal or a drive pulse. Which is a signal at any nodes of the second control 250. Furthermore, the feedback signal may also indicate an expected amount of compensation for the received power. As another option, the feedback signal may also indicate an operation for achieving an expected regulation of the power supply.

The feedback signal may also be a high frequency, a DC signal or a low frequency signal. To guarantee the transmission reliability, the feedback signal may be converted to a high-frequency electrical pulse signal. As shown in FIG. 2, the pulse signal transmitter 260 can be implemented with an optical element, such as an infrared emitting diode (IRED) or a light emitting diode (LED). The electrical pulse signal may be converted into an optical pulse signal by the pulse signal transmitter 260.

Correspondingly, the pulse signal receiver 230 may also be implemented with an optical element, such as a photodiode (PD). After receiving the optical pulse signal, the photodiode may convert the optical pulse signal transmitted from the pulse signal transmitter 260 into an electrical pulse signal.

For the transmission of the pulse signal, the optical elements are provided for achieving an optical communication between the pulse signal receiver of the wireless power supply device and the pulse signal transmitter of the powered device. Since the cost of the optical element is much lower than that of chips in a conventionally used communication module, the cost can be reduced. At the same time, since the fast transmission of the high frequency pulse signal does not depend on specific communication protocols, the speed of dynamic response can be accelerated.

Then the first control unit 220 may recover the feedback signal from the electrical pulse signal and generate a driver signal based on the feedback signal to control the operation of the inverter 211. For example, the drive signal may control the switching on/off of the switching elements of the inverter 211.

Figure 3A:
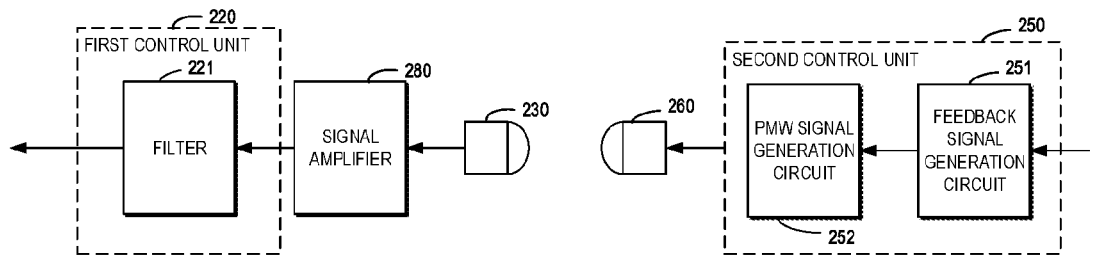
FIGS. 3A-3C show different application scenarios for the wireless power transmission system in accordance with embodiments of the present disclosure.
Figure 3B:
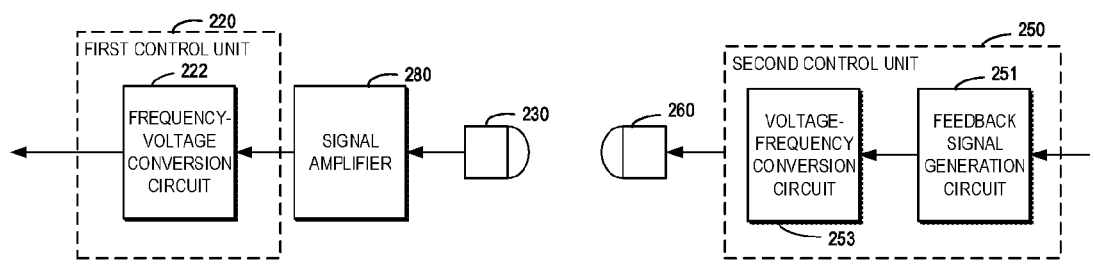
Figure 3C:
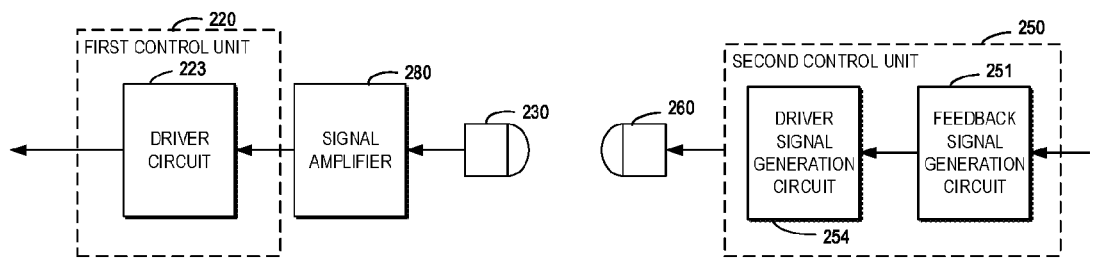

As mentioned above, depending on the different output signals, the feedback signal may indicate different information. Meanwhile, the feedback signal may be referred to as a DC signal or low frequency signal or a high frequency signal. Thus, for the feedback signal of different types, different conversion may be implemented. FIGS. 3A-3C show different application scenarios for the wireless power transmission system in accordance with embodiments of the present disclosure. With reference to FIGS. 3A-3C, different procedures for transmitting the feedback signal will be described in detail.

In a case that the feedback signal is a DC signal or low frequency signal, the feedback signal may be generated at a feedback signal generation circuit 251 of the second control unit 250 and may be converted to a Pulse Width Modulation (PWM) signal or a Pulse Frequency Modulation (PFM) signal.

For example, as shown in FIG. 3A, the second control unit 250 may comprise a PWM signal generation circuit 252 to generate a PWM signal from the feedback signal. The PWM signal may be converted to an optical pulse signal by the pulse signal transmitter 260 and transmitted it to the pulse signal receiver 230. The pulse signal receiver 230 may converted the optical pulse signal into an electrical pulse signal back and transfer the electrical pulse signal to the signal amplifier 280, which is coupled between the pulse signal receiver 230 and the first control unit 220 and configured to amplify the first electrical signal. The first control unit 220 may comprise a filter 221. The amplified pulse signal may be recovered into the feedback signal through the filter 221.

In some embodiments, as shown in FIG. 3B, the second control unit 250 may comprise a voltage-frequency conversion circuit 253 to generate a PFM signal from the feedback signal. As another option, the voltage-frequency conversion circuit 253 may be replaced by a PFM modulator, which may also generate a PFM signal. The PFM signal may be converted to an optical pulse signal by the pulse signal transmitter 260 and transmitted it to the pulse signal receiver 230. The pulse signal receiver 230 may converted the optical pulse signal into an electrical pulse signal back and transfer the electrical pulse signal to the signal amplifier 280, which is coupled between the pulse signal receiver 230 and the first control unit 220 and configured to amplify the first electrical signal. The first control unit 220 may comprise a frequency-voltage conversion circuit 222. The amplified pulse signal may be recovered into the feedback signal through the frequency-voltage conversion circuit 222.

In a case that the feedback signal is a high frequency signal, the feedback signal may be generated at a feedback signal generation circuit 251 of the second control unit 250 and may be converted to a driver signal.

In some embodiments, as shown in FIG. 3C, the second control unit 250 may comprise a driver signal generation circuit 254 to generate a driver signal from the feedback signal. The driver signal may be converted to an optical pulse signal by the pulse signal transmitter 260 and transmitted it to the pulse signal receiver 230. The pulse signal receiver 230 may converted the optical pulse signal into an electrical pulse signal back and transfer the electrical pulse signal to the signal amplifier 280, which is coupled between the pulse signal receiver 230 and the first control unit 220 and configured to amplify the first electrical signal. The first control unit 220 may comprise a driver circuit 223. The amplified pulse signal may be recovered into the feedback signal through the driver circuit 223.

Figure 4:
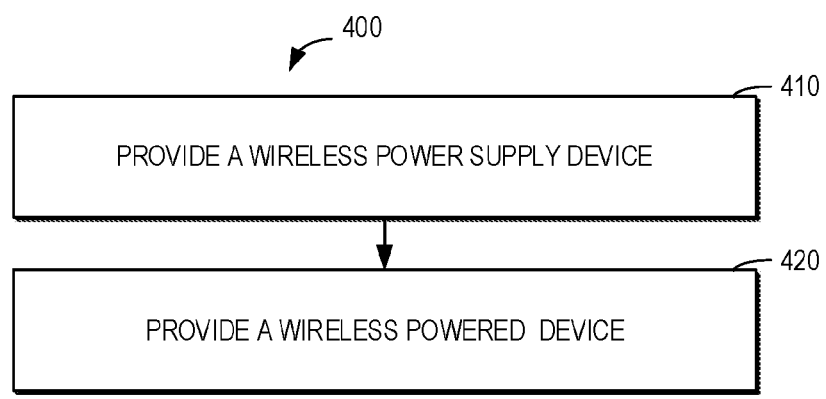
FIG. 4 shows a flowchart illustrating a manufacturing method of the wireless power transmission system according to embodiments of the present disclosure.

Further, the present disclosure also provides a manufacturing method of the wireless power transmission system. FIG. 4 shows a flowchart illustrating a manufacturing method of the wireless power transmission system according to embodiments of the present disclosure.

At 410, a wireless power supply device 110 as mentioned above is provided. And at 420, a wireless powered device 120 as mentioned above is provided.

According to the scheme of the wireless power supply proposed in the present disclosure, a pulse signal is transferred from the powered device to the wireless power supply device for providing the information associated with the received power at the powered device, to adjust the wireless power supply. In this way, the speed of the feedback response in the system will be increased and therefore the performance of the system can be improved.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A wireless power supply device comprising:
    a first circuit coupled to a DC supply, wherein the first circuit is configured to convert a DC voltage of the DC supply into an AC voltage to enable wireless power transmission between the wireless power supply device and a wireless powered device;
    a pulse signal receiver configured to receive a first pulse signal from the wireless powered device and to generate a second pulse signal based on the first pulse signal, the first pulse signal being generated based on a feedback signal of the wireless powered device indicating information associated with a received power of the wireless powered device; and
    a first control unit coupled to the first circuit and the pulse signal receiver, and configured to control conversion of the first circuit based on the second pulse signal.

2. The wireless power supply device of claim 1,
    wherein the first pulse signal is an optical pulse signal, and
    wherein the pulse signal receiver comprises a photo diode configured to receive the optical pulse signal and convert the optical pulse signal to an electrical pulse signal as the second pulse signal.

3. The wireless power supply device of claim 1,
    wherein the first circuit comprises an inverter,
        wherein the inverter includes a plurality of switching elements to invert the DC voltage into the AC voltage.

4. The wireless power supply device of claim 3, wherein the first control unit configured to:
    recover the feedback signal from the second pulse signal;
    determine the information associated with received power of the wireless powered device based on the feedback signal; and
    generate a drive signal based on the information, to control an operation of the plurality of switching elements.

5. The wireless power supply device of claim 1, further comprising:
    a signal amplifier coupled between the first control unit and the pulse signal receiver and configured to amplify the second pulse signal.

6. A wireless powered device comprising:
a second circuit configured to receive, in a wireless manner, power from a wireless power supply device;
a second control unit coupled to the second circuit and configured to generate, based on an output signal from the second circuit, a feedback signal indicating information associated with a received power of the wireless powered device; and
a pulse signal transmitter coupled to the second control unit and configured to generate a first pulse signal from a third pulse signal generated based on the feedback signal and to transmit the first pulse signal to a pulse signal receiver of the wireless power supply device.

7. The wireless powered device of claim 6,
wherein the third pulse signal is an electrical pulse signal,
wherein the pulse signal transmitter comprises:
an infrared emitting diode configured to convert the electrical pulse signal to an optical pulse signal as the first pulse signal and to transmit the optical pulse signal to the pulse signal receiver.

8. The wireless powered device of claim 6,
wherein the third pulse signal is an electrical pulse signal, and
wherein the pulse signal transmitter comprises:
a light emitting diode configured to convert the electrical pulse signal to an optical pulse signal as the first pulse signal and to transmit the optical pulse signal to the pulse signal receiver.

9. The wireless powered device of claim 6, wherein the second control unit further comprises:
a Pulse Width Modulation signal generation circuit configured to generate the third pulse signal based on the feedback signal,
wherein a pulse width of the third pulse signal being modulated related to the received power.

10. The wireless powered device of claim 6, wherein the second control unit further comprises:
a voltage-to-frequency conversion unit configured to generate the third pulse signal based on the feedback signal,
wherein a frequency of the third pulse signal being converted related to the received power.

11. The wireless powered device of claim 6, wherein the second control unit further comprises:
a drive signal generation unit configured to generate the third pulse signal based on the feedback signal,
wherein the third pulse signal indicating a regulation pattern for the wireless power supply device related to the received power.

12. A wireless power transmission system comprising:
the wireless power supply device according to claim 1; and
the wireless powered device, wherein the wireless powered device comprises:
a second circuit configured to receive, in a wireless manner, power from the wireless power supply device;
a second control unit coupled to the second circuit and configured to generate, based on an output signal from the second circuit, the feedback signal indicating information associated with the received power of the wireless powered device; and
a pulse signal transmitter coupled to the second control unit and configured to generate the first pulse signal from a third pulse signal generated based on the feedback signal and to transmit the first pulse signal to the pulse signal receiver of the wireless power supply device.

13. The wireless powered transmission system of claim 12,
wherein the third pulse signal is an electrical pulse signal,
wherein the pulse signal transmitter comprises:
an infrared emitting diode configured to convert the electrical pulse signal to an optical pulse signal as the first pulse signal and to transmit the optical pulse signal to the pulse signal receiver.

14. The wireless powered transmission system of claim 12,
wherein the third pulse signal is an electrical pulse signal, and
wherein the pulse signal transmitter comprises:
a light emitting diode configured to convert the electrical pulse signal to an optical pulse signal as the first pulse signal and to transmit the optical pulse signal to the pulse signal receiver.

15. The wireless powered transmission system of claim 12, wherein the second control unit further comprises:
a Pulse Width Modulation signal generation circuit configured to generate the third pulse signal based on the feedback signal,
wherein a pulse width of the third pulse signal being modulated related to the received power.

16. The wireless powered transmission system of claim 12, wherein the second control unit further comprises:
a voltage-to-frequency conversion unit configured to generate the third pulse signal based on the feedback signal,
wherein a frequency of the third pulse signal being converted related to the received power.

17. The wireless powered transmission system of claim 12, wherein the second control unit further comprises:
a drive signal generation unit configured to generate the third pulse signal based on the feedback signal,
wherein the third pulse signal indicating a regulation pattern for the wireless power supply device related to the received power.

18. A method for manufacturing a wireless power transmission system, comprising:
providing the wireless power supply device according to claim 1; and
providing the wireless powered device, wherein the wireless powered device comprises:
a second circuit configured to receive, in a wireless manner, power from the wireless power supply device;
a second control unit coupled to the second circuit and configured to generate, based on an output signal from the second circuit, the feedback signal indicating information associated with the received power of the wireless powered device; and
a pulse signal transmitter coupled to the second control unit and configured to generate the first pulse signal from a third pulse signal generated based on the feedback signal and to transmit the first pulse signal to the pulse signal receiver of the wireless power supply device.

* * * * *